UNITED STATES PATENT OFFICE.

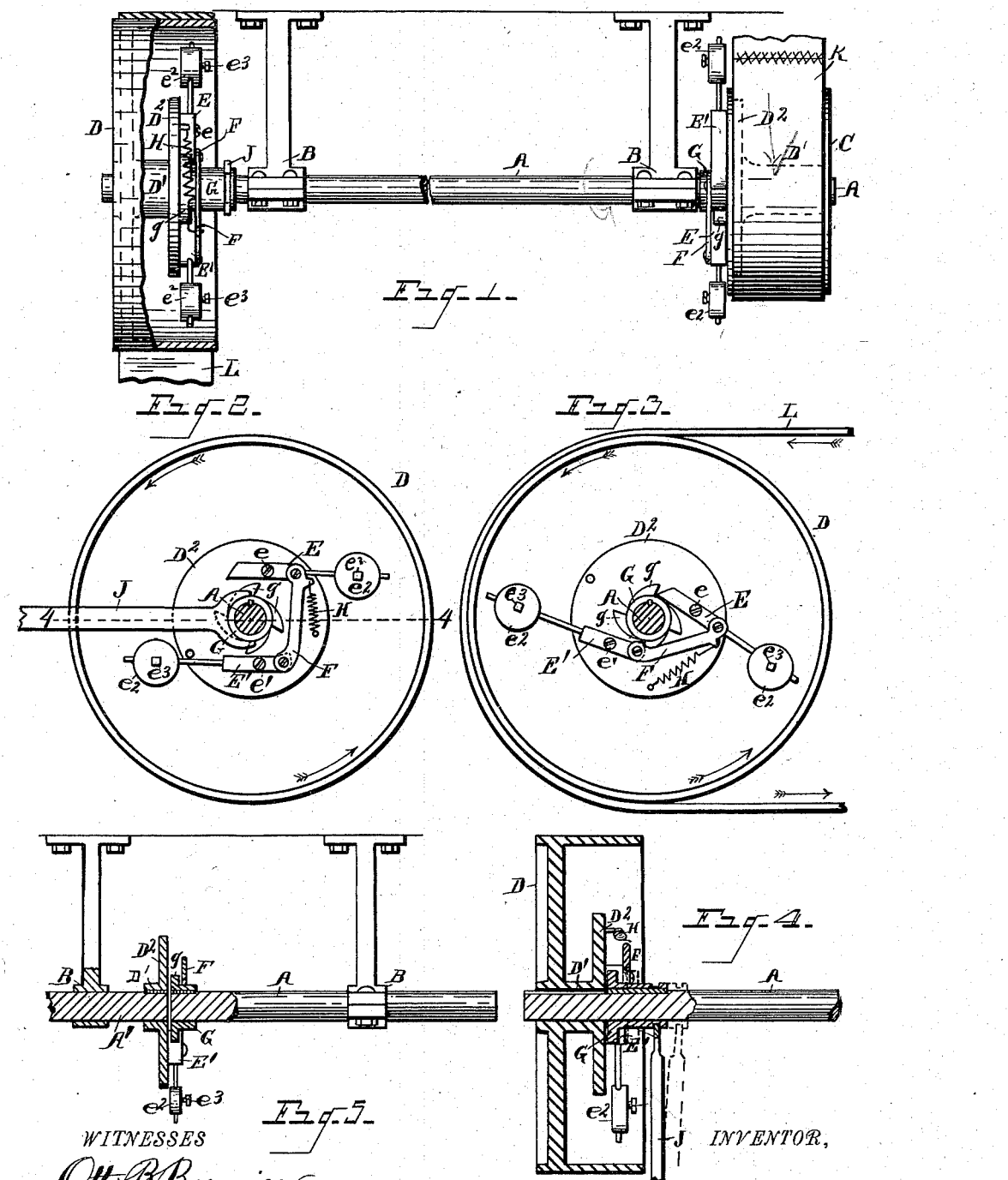

LUCIUS W. ELLIOTT, OF NORTHVILLE, MICHIGAN, ASSIGNOR OF ONE-HALF TO WILLIAM H. YERKES, OF SAME PLACE.

AUTOMATIC PULLEY-CLUTCH AND SHAFT-COUPLING.

SPECIFICATION forming part of Letters Patent No. 530,301, dated December 4, 1894.

Application filed June 4, 1894. Serial No. 513,344. (No model.)

*To all whom it may concern:*

Be it known that I, LUCIUS W. ELLIOTT, a citizen of the United States, residing at Northville, county of Wayne, State of Michigan, have invented a certain new and useful Improvement in an Automatic Pulley-Clutch and Shaft-Coupler; and I declare the following to be a full, clear, and exact description of the invention, such as will enable others skilled in the art to which it appertains to make and use the same, reference being had to the accompanying drawings, which form a part of this specification.

My invention consists in an automatic pulley clutch and shaft coupling of novel construction embodying a combination of devices as hereinafter described and claimed, and illustrated in the accompanying drawings, in which—

Figure 1 is a side elevation showing a part broken away. Fig. 2 is an end elevation showing the shaft in cross section and the clutch mechanism in inoperative position. Fig. 3 is a similar view, but showing the clutch mechanism in operative position. Fig. 4 is a section longitudinally of the shaft on the line 4—4, Fig. 2. Fig. 5 is a vertical section illustrating a modification.

My invention is designed more particularly to provide a pulley clutch and shaft coupling whereby a different power may be applied to a rotatable shaft while the shaft is in rotation, without the necessity of stopping the machinery to change the power.

My invention is adapted and designed, for example, to change the driving power of a set of machinery from steam power to water power. Thus, for instance, where steam power and water power are provided for running a mill, when the water power is insufficient for the purpose, steam power is utilized for running the machinery, but when the water power becomes sufficient it is desired to turn on the water power and stop the engine. So also, it is sometimes desirable when repairs are required in one source of power or another, to change the source of power. For example, where two or more engines are provided, or a steam engine and a water wheel, should it be required to repair a given driving mechanism, it is desirable to apply a different driving mechanism without stopping the machinery. It is well understood that in a flouring mill, for instance, the stopping of the machinery injures the product for the time being, in stopping and starting the machinery.

My invention is designed to overcome these difficulties, and objectionable features, and to enable the operator to change from one power to another while the machinery is in active operation.

I carry out my invention as follows:

In the drawings, A represents a driving shaft from which any desired machinery is run. B denotes any suitable bearings. C represents a driving pulley upon said shaft with which, we will suppose, a steam engine may be belted. D represents an additional driving pulley, with which, we will suppose, a water wheel may be belted. Each of said pulleys is, preferably, mounted loosely upon the shaft A, so that the shaft may run independently of one of the pulleys when the shaft is driven by the steam engine or by the water wheel as the case may be. Each pulley is shown provided with a hub D' with which is engaged a disk D².

E and E' denote centrifugal arms pivotally engaged upon said disk, as shown at $e$ and $e'$. Arms E and E' are connected by a link F so as to be simultaneously operated. The outer extremities of the arms E and E' are provided with weights $e^2$ respectively, said weights being preferably adjustable on said arms and held in place in any suitable manner, as by means of a set screw $e^3$.

Upon the shaft A, adjacent to the disk D², is a hub G having a fixed engagement upon the shaft A in any suitable manner so as to be rotatable therewith. In Fig. 4 the shaft A is shown provided with a key-way and with a key engaging the hub G fixedly upon the shaft. The hub G is provided with ratchet teeth $g$ of any desired number. The inner ends of arms E, E', constitute pawls or dogs engageable with said ratchet teeth of the hub G, when by centrifugal force said arms are thrown into operative position. When in operative position, the arms E, E', lock the corresponding pulley in engagement with the hub G, and the shaft A may then be caused to rotate by the power applied to the pulley, which we will suppose, for example, to be water power. We will suppose the pulleys to rotate in the direction indicated by the arrows. It will be readily understood that when no power is applied, for example, to the pulley D, but power is applied to the pulley C, the shaft A will rotate independently of the pulley D, and the pulley D with its hub D' and disk D² will stand idle or unmoved. In this condition the rotation of hub G in the direction of the arrows will readily cause the teeth g to ride up from in under, or out of engagement with the adjacent extremities of the arms E and E', the teeth g being constructed with cam faces on their peripheries or upper surfaces.

To hold the inner ends of the arms E, E', out of contact with the teeth g when in inoperative position, so as not to ride upon the outer faces of said teeth, I prefer to provide a spring H, to which may be given just the required tension to normally hold the pawl ends of the arms E, E', out of contact with the teeth. Now should it be desired to apply a different power, for example, to turn on a water power and stop the steam engine, the belt may be thrown on to the pulley D and thrown off from the pulley C. This will cause the pulley D, with its disk D², to revolve, the initial revolution of the pulley D being independent of the shaft A; but as the pulley D is rotated, centrifugal force will throw outward the weighted arms E and E', as indicated in Fig. 3, bringing the pawl ends of said arms into engagement with the toothed hub G, and when this has been accomplished, the power applied to the pulley D will drive the shaft A, and it will be evident that the change of power can be readily made, power being applied to the pulley D without stopping the rotation of the shaft A.

The mechanism herein shown may also constitute a shaft coupling, as illustrated in Fig. 5. In this case the disk D² is engaged to rotate with the shaft A', the hub G being engaged, as already described, with the shaft A. The disk D² is provided with the centrifugal arms E, E', engageable with the toothed hub G, so that when the shaft A' is rotated, the arms E, E', will engage the toothed hub G, thus coupling both shafts and rotating them together, the principle and mechanical construction being the same as hereinbefore described.

In the drawings I have shown, as in Fig. 1, the outer extremities of the arms E, E', within the periphery of the adjacent pulley, but said arms may be so located as to extend beyond the pulley.

To throw the pulleys out of engagement with the hub G, my invention contemplates as coming within its scope, making the hubs G longitudinally reciprocatory upon the shaft A and engaging therewith a lever J of ordinary construction arranged to throw the hub G lengthwise upon the shaft and out of engagement with the arms E and E', if desired.

I do not however, limit myself to making the hub G longitudinally reciprocatory, as it may or may not be so engaged upon the shaft A.

Figs. 3 and 5 of the drawings show the hub G engaged upon the shaft without mechanism for shifting it lengthwise of the shaft. The remaining figures show the hub G arranged to be so moved upon the shaft as to permit its disengagement with the centrifugal arms. By means of the lever J it will be apparent the operator whenever desired can move the hub G away from engagement with the inner ends of the arms E, E', and thereby free from the centrifugal arms so that the shaft A will be entirely disengaged from the pulley corresponding thereto.

K represents a belt on the driving pulley C, and L a belt on the driving pulley D.

The utility, simplicity, and ready operation of the device are apparent.

To constitute a shaft coupling, the pulley may be omitted, employing the disk with its hub.

While I have described the pulleys provided with a hub and disk, I do not limit myself solely to this construction, as the arms E, E' may be engaged in any suitable manner with the pulley where the pulley is employed.

While I have shown two centrifugal arms, any desired number may be employed, as may be desired.

My invention contemplates providing the pulley C also with the automatic clutch mechanism essentially the same as that shown in connection with the pulley D, whereby when the power is turned off from pulley D, power may be applied in the same manner by means of the pulley C. The centrifugal arms E, E' are shown in connection with the pulley C extended beyond the periphery thereof, the disk to which said arms are connected being located adjacent to the edge of the pulley, as shown in dotted lines. The disk might be entirely omitted if desired, and the arms E, E', be pivotally connected directly with the pulley.

What I claim as my invention is—

1. The combination with a rotatable shaft, of a toothed hub rotatable with said shaft, a rotatable disk, and centrifugal arms pivotally connected with said disk, said arms engageable with the toothed hub when the disk is rotated, thereby rotating the shaft, substantially as set forth.

2. The combination with a rotatable shaft, of a toothed hub rotatable with said shaft, a disk rotatable independently of said hub, and centrifugal arms pivotally connected with said disk, said arms engageable with said hub when the disk is rotated thereby to effect the simultaneous rotation of the disk and hub, substantially as set forth.

3. The combination with a rotatable shaft, of a toothed hub rotatable with said shaft and movable longitudinally thereupon, a disk rotatable independently of said hub, and centrifugal arms pivotally connected with said disk, said arms engageable with said hub when the disk is rotated thereby to effect the simultaneous rotation of the disk and hub, substantially as set forth.

4. The combination with a rotatable shaft, of a toothed hub rotatable with said shaft, a disk rotatable independently of said hub, and centrifugal arms pivotally connected with said disk, said arms engageable with said hub when the disk is rotated, thereby to effect the simultaneous rotation of the disk and hub, said arms connected the one with the other, substantially as set forth.

5. The combination with a rotatable shaft, of a toothed hub rotatable with the shaft, a disk rotatable independently of said hub, and centrifugal arms pivotally connected with said disk, said arms engageable with said hub when the disk is rotated, thereby to effect the simultaneous rotation of the disk and hub, said arms connected the one with the other, and springs to hold said arms out of engagement with the hub when the disk is inoperative, substantially as set forth.

6. The combination with the rotatable driving shaft, of a driving pulley C, a driving pulley D loosely mounted on said shaft, a toothed hub G rotatable with the shaft, and centrifugal arms E, E' connected with the pulley D to engage the toothed hub when the pulley D is rotated, substantially as set forth.

7. In combination, a driving shaft, two pulleys mounted thereupon to rotate said shaft in the same direction the one independently of the other, and centrifugally operated mechanism whereby either of said pulleys may be caused to rotate said shaft independently of the other and without stopping the rotation of the shaft to throw either pulley into operation, substantially as set forth.

8. The combination with a rotatable shaft, of a toothed hub rotatable with the shaft and movable longitudinally thereupon, independently rotatable centrifugal arms engageable with said hub to effect the simultaneous rotation of the hub therewith, and means to shift the hub out of engagement with said arms, substantially as set forth.

In testimony whereof I sign this specification in the presence of two witnesses.

LUCIUS W. ELLIOTT.

Witnesses:
N. S. WRIGHT,
O. B. BAENZIGER.